United States Patent [19]

Löfberg

[11] Patent Number: 4,595,950
[45] Date of Patent: Jun. 17, 1986

[54] METHOD AND APPARATUS FOR MARKING THE INFORMATION CONTENT OF AN INFORMATION CARRYING SIGNAL

[76] Inventor: Bo Löfberg, Vindragarvägen 12, S-117 40 Stockholm, Sweden

[21] Appl. No.: 682,264

[22] Filed: Dec. 17, 1984

Related U.S. Application Data

[63] Continuation of Ser. No. 385,374, filed as PCT SE 81/00279, Sep. 25, 1981, published as WO80/01273, Apr. 15, 1982, § 102(e) date May 18, 1982, Pat. No. 4,528,588.

[30] Foreign Application Priority Data

Sep. 26, 1980 [SE] Sweden ........................ 8006772
Dec. 23, 1980 [SE] Sweden ........................ 8009138

[51] Int. Cl.⁴ ............... H04N 7/167; G11B 15/04; G06F 7/04; G07D 7/00
[52] U.S. Cl. ................... 358/122; 340/825.33; 340/825.34; 360/5; 360/60; 369/84
[58] Field of Search ........... 360/5, 60; 369/84; 358/122, 123; 340/825.33, 825.34

[56] References Cited

U.S. PATENT DOCUMENTS

| | | |
|---|---|---|
| 3,890,461 | 6/1975 | Vogelman et al. ............ 358/117 |
| 3,963,865 | 6/1976 | Songer . |
| 4,040,099 | 8/1977 | Cook . |
| 4,058,830 | 11/1977 | Guinet et al. ................ 358/117 |
| 4,086,634 | 4/1978 | Cook . |
| 4,100,575 | 7/1978 | Morio et al. . |
| 4,185,305 | 1/1980 | Perret et al. . |
| 4,278,837 | 7/1981 | Best ............................. 178/22.09 |
| 4,292,650 | 9/1981 | Hendrickson ............... 358/117 |
| 4,338,628 | 6/1982 | Payne et al. ................ 358/117 |
| 4,354,201 | 10/1982 | Sechet et al. ............... 358/122 |
| 4,367,402 | 1/1983 | Giraud et al. ............... 235/380 |

FOREIGN PATENT DOCUMENTS 381940 12/1975 Sweden .
2020869 11/1979 United Kingdom .

*Primary Examiner*—S. C. Buczinski
*Attorney, Agent, or Firm*—Frishauf, Holtz Goodman & Woodward

[57] ABSTRACT

An information signal (INF) which is transmitted in coded form (CINF) from a signal source (RC) to a signal receiver (4, 5) is decoded at the receiver and at the same time marked (MINF) by the introduction of an identification information (ID) which is characteristic of the receiver or its possessor. The signal from a video disc (RC) carrying a coded programme is decoded and marked before it is supplied to a television set (6). Via said identification information of so-called pirate copy is directly traceable to its originator. Thereby a protection against such copying is obtained. A device for the playback of a video disc of this type comprises a decoding and modification unit to which the necessary decoding information and identification information may be supplied from a personal data carrier (ID).

14 Claims, 4 Drawing Figures

METHOD AND APPARATUS FOR MARKING THE INFORMATION CONTENT OF AN INFORMATION CARRYING SIGNAL

This is a continuation of application Ser. No. 385,374 filed as PCT SE81/00279, Sep. 25, 1981, published as WO80/01273, Apr. 15, 1982, § 102(e) date May 18, 1982, now U.S. Pat. No. 4,528,588.

FIELD OF INVENTION

This invention is directed to a method for processing a coded information signal which may comprise video and/or audio information, when transmitted from a signal source to a signal receiver in order to prevent an unauthorized use of the information content of the signal. The signal source may comprise a record carrier of the type magnetic tape or a disc which may be read optically/capacitively. The invention is also directed to a device for carrying out the method and a device for the playback of a record carrier, a television set and a data carrier for carrying out the method.

It is observed that the method according to the invention is useful also for record carriers comprising audio information only. Furthermore it should be observed that the signal source may comprise a radio or a television transmitter station and that the signal receiver may comprise a radio receiver or a television receiver. In this respect is referred to what follows. One further possible application of the method is the protection of computer software, for example software for so called personal computers.

However, in order to make the following description clearer it will be directed on the first hand to the use of the invention for record carriers of the type mentioned above, that is magnetic tape and optically/capacitively readable discs, and then the actual record carriers will be named video tape and video disc, respectively, said record carriers comprising prerecorded video and audio information.

BACKGROUND OF INVENTION

Consumer devices for recording and playback of video tape, that is video tape recorders, have been available on the market for some years, However, said devices have not as yet become so popular on the market, which of course has to do with the fact that a video tape recorder is an apparatus which is comparatively complicated and which demands a purchase price which is relatively high. A video tape recorder intended for private use is used in two ways mainly, that is on the first hand for a private recording/playback of TV-programmes, and on the other hand for playback of pre-recorded video tapes containing preferably films of so called B- and C-class. Generally it is considered that the slow development of the market for video tape recorders to a significant extent depends on the fact that the offer of pre-recorded programmes is limited and often of a low quality. Today the so called video disc is introduced on some markets, said disc being in one shape named as VLP, the playback of which requires a so called video disc player. The situation of the video disc is the same, that is the difficulty to provide a good programme software. The relatively low interest from the side of the programme producers for the markets of video tapes and video discs, respectively, may be explained to a significant extent probably by the fact that a production of a video programme requires considerable economic resources and that a programme, being recorded on a video tape or a video disc and being offered for rent or sale, may be reproduced very easily to another video tape. These reproductions, so called "pirate copies", may afterwards be offered at a price which is a fraction only of the price to be paid for the original tape or disc. As a consequence the programme producer is not guaranteed a necessary return. Already on the limited market of today the problem of pirate copies is significant.

From the side of the film producers has been announced an interest for a novel use of the video disc or the video tape, meaning that in parallel with the introduction of a new film at the cinemas the one and same film should also be kept available on a video disc or a video tape. Instead of visiting the cinema it will then be possible to rent a film on a video disc or a video tape and to watch it at home. It may be expected that this possibility will be of special interest for persons who may not go to the cinema for practical reasons. Then the video discs or video tapes may be distributed for example via the ticket office of the cinema, offering a film for rent one day for an eventual return the next following day. Each cinema playing a given film may at the same time have available for rent a number of video discs or video tapes carrying the same film.

The problems actualized when the video disc or the video tape is used in this way are of two different types mainly. The first problem has already been discussed above and has regard to the so called pirate copying. A filmproducer who may be expected to hold available a film programme for this use must be guaranteed a protection against unauthorized use by pirate copying which is satisfactory. The other problem is an administrative one and has to do with how to obtain a simple and relyable registration of the identity of the renting customer, the date of renting and return, respectively, charge of rent, etc.

DESCRIPTION OF PRIOR ART

U.S. Pat. No. 3,963,865 describes a method which means that the vertical synchronization interval of the video signal is changed, for example by a suppression of pulses, before recording or transmission of the signal. Said changes may be tolerated by a TV-receiver but not a video tape recorder, and thereby reproduction of a quality which is acceptable is prevented during playback.

U.S. Pat. No. 4,100,575 describes a method which means that given vertical synchronization pulses and equalization pulses within the vertical blanking interval are replaced by pulses of the same amplitude and frequency. Thereby a correct recording of the video signal by means of an ordinary videotape recorder is prevented, which in turn means that the playback of the video signal will be strongly interferred. The modifications which are introduced may be tolerated by an ordinary TV-set.

U.S. Pat. No. 4,185,305 describes a method which means that a first control information is introduced during recording of a video signal, said first control information being distorted by the recording in a manner such that it is not useful for controlling the reproduction of the video signal, being instead reproduced under the control of a second control information formed from the reproduced first control information. Accordingly, a specifically adapted equipment for forming the second control information during reproduction is required.

U.S. Pat. No. 4,086,634 describes a method for use on audio signals and which means introduction of a high frequency modulated signal outside the audible frequency range. When copied on a magnetic tape cross-modulation or a different interference between this high frequency signal and the high frequency "recording bias signal" which is normally supplied to a tape in a tape recorder before recording will appear. This cross-modulation will generate detectable interferencies and may interfere with the audible frequency range.

U.S. Pat. No. 4,040,099 describes a method for use on audio signals and which means introduction of a low frequency signal into the audio signal as well as a high frequency signal which is modulated by the low frequency signal. During copying a phase delay between the introduced signals will appear and thereby copies may be separated from original recordings.

The copy guard obtained by the first two described rethods is based on prevailing technical differences between control circuits of a TV-set and the corresponding control circuits of a video tape recorder. Obviously a protection of this type may be eliminated by a technical counter measure. This counter measure may be that the distorted control signals are replaced by correct control signals by processing the signal a second time or also an auxilliary device which will make the video tape recorder to accept the distorted control signals.

In a similar way the protection obtained by the method according to U.S. Pat. No. 4,185,305 may be eliminated by processing the signal a second time and-/or auxilliary devices.

The method according to U.S. Pat. No. 4,086,634 may obviously be eliminated easily by filtering away the high frequency signal which is introduced. Apparently, this counter measure ray be used also for the method according to U.S. Pat. No. 4,040,099 which method has the further disadvantage that a frequencey band of the programme signal is suppressed.

Consequently the methods presented above have in common that the copyguard which is obtained may be eliminated by means of technical counter measures of a kind which is more or less advanced. The requirement, that an information signal, which is protected by such methods should be reproducible by anyone having available an adequate equipment of a complexity which is commercially useful, means as such that the protection may be eliminated at the expense of sufficient technical and economical resources. Ultimately, this may be regarded as a consequence of the fact that the signal portions comprising the video and/or audio information which is reproduced, appear in an original form in the "protected" signal.

From what has been mentioned above is clear that the prior art methods do not offer an adequate protection for pirate copying of video tapes and video discs or other carriers of a software which is of commercial interest.

SHORT DESCRIPTION OF THE INVENTION

The object of invention is to provide a method of the type mentioned in the introduction not showing the drawbacks of the prior art methods, which may be used to guarantee the producer of a video or audio programme or any different information a protection against unauthorized use, and which among other things may solve said problems with rent or sale of pre-recorded video tapes and video discs and furthermore to obtain a device for the reception of signals from such video tapes or video discs or different information signals.

The object of invention is obtained by a method as mentioned in the introduction and which according to the invention is characterized in that the coded information signal is decoded at the signal receiver and at the same time modified by the introduction into the decoded information signal of an identification information, which is characteristic of the signal receiver or its possessor, said identification information being introduced into such times spaces and/or frequency ranges of the information signal that an extraction of the information content is not influenced at all or to a neglectable extent only, and that said decoding is carried out by the use of a decoding information which, as also said identification information, is kept available for the signal receiver.

By the method according to the invention the problem with the actual kind of unauthorized use of information is attacked in a way which is totally different from prior art. According to prior art, methods are aimed at which have the purpose of preventing, by technical measures, practically useful reproductions of the information and having the above mentioned and obviously unavoidable drawbacks making the methods unuseful for the protection of informtion being under the threat of pirate copying. According to the invented method a reproduction of the decoded information is technically possible but every single reproduction is marked. By this technical measure combined with an agreement in which a user agrees not to make unauthorized copies of the information, a copy guard is obtained. As will be clear from the following both said coding or scrambling and said marking may be carried out so that the same of technical and economical reasons may not be circumvented and eliminated, respectively.

One preferred embodiment of the method according to the invention intended for use when the signal source comprises a record carrier of the type magnetic tape or optically/capacitively readable disc comprising a coded information signal, the information content of which consists of a prerecorded video or audio programme, and being intended to be offered for sale or rent, and when the signal receiver comprises an ordinary tape or disc recorder for reading the record carrier, is characterized in that the coded information signal, which is read from the record carrier, is supplied to a decoding and modification unit to which is supplied also decoding and personal identification information from a personal data carrier, and in which an information signal which is decoded and marked by personal identification information is obtained from the decoding and modification unit.

Said personal data carrier, which may comprise a card having a loop of magnetizeable material or a so called active data card comprising semiconducter memories and circuits which may perform data processing to some extent, may also be used for the registration of date and hour eventually at the occasion of rent, from which follows that it is possible at the return to calculate in simple manner the length of the renting period and thereby the rent due.

The fact that the information of the record carrier is coded makes it necessary to use the personal data carrier at the playback occasion, which in turn brings with it that a personal identification code obtained from said personal identification information is unavoidably introduced into the information signal. If the decoded information is copied to another medium, for example from a video disc to a video tape, the produced copy will contain said personal identification code. Thereby, pirate copies produced in this manner and offered on the market may be traced to the source, that is a defined person, by means of the personal identification code.

For carrying out the method according to the invention a specific equipment is required for reception and processing of information signals from the signal source. A device for obtaining this is characterized according to the invention by a decoding and modification unit having one input for reception of the coded information signal from the signal source and comprising means for decoding the signal dependent on a decoding information which is supplied, and means for modifying simultaneously the decoded signal by the introduction of an identification information which designates the signal receiver or which comprises the personal code of its possessor, alternatively In the case of video discs and video bands regular professional equipment is used for recording, the difference being that the information signal is processed in a coding unit before it is supplied to a registration means, which in usual manner performs the registration on the record carrier. For example the coding unit may be so arranged that a pseudo-random bit sequence is superposed on the information signal.

The user of a record carrier so recorded must have available a playback apparatus comprising a unit for decoding and modification of the information signal. Otherwise the playback apparatus should be of a conventional type for the type of record carriers in question so as to allow playback also of record carriers having an information content which is not coded. A playback apparatus of this type and comprising among other things conventional means for driving and reading is characterized according to the invention in that the playback apparatus comprises a supplementary device having means for communicating with said personal data carrier and preferably for reading decoding and personal identification information from the same, a decoding and modification unit having at least one input which is connected to said communicating means for the reception of the decoding and personal identification information which is read, and one input for the reception of the coded information signal which is read from the record carrier, in which said unit comprises means for decoding the information signal dependent on said decoding information and means for introducing into the same a personal code obtained from said personal identification information, and an output for supplying the information signal (MINF) modified by said personal code to a reproduction to an apparatus, which may comprise a display screen and loudspeaker elements.

Said communication means and unit may be built into the playback apparatus, in which case the only observable modification thereof consists of an insertion slot in case said data carrier is shaped as a card, or, alternatively, the same may be shaped as a separate supplementary device which may be simply connected to the playback apparatus.

From the above mentioned is clear that the object of invention is to provide a protection against unauthorized copying of video discs and video tapes at first hand, said copying meaning normally in the first case that the content of a video disc is transferred to a video tape and in the second case that this content is transferred from one video tape to another tape. A practically useful protection is obtained if it is combined with substantial difficulties for a person to provide copies without revealing his identity by the personal identification code which is introduced, and further if the investment costs for the equipment which is required for producing copies without said personal identification code are substantial and thereby a hindrance for a more professional pirate copying activity.

In order for said requirements to be fulfilled it must be seen to at first hand that the information signal after having been decoded, but before the modification in the form of a superposed or differently introduced personal identification code, is physically difficult to get access to a playback apparatus. This may be obtained by the use of a so called consumer adapted integrated circuit of the LSI type (LSI=large scale integration) holding said decoding and modification unit and eventually belonging memories for temporary storage of decoding and personal identification information. Thereby is obtained that the signal processing will be so to say integrated into the circuit, that is the decoded version of the information signal is not externally available on anyone of the terminals of said LSI-circuit. Access to the decoded information signal in its unmodified shape requires knowledge about the operation and structure of the LSI-circuit and ability and equipment for breaking up the circuit and localizing lines of the internal line pattern of the circuit. This LSI circuit may be built in a manner such that any attempt in this direction will lead to a loss of stored or appearing information, see for example SE Patent Specification No. 7305050-2. In second hand the personal identification code must be so introduced that it may not in simple manner be eliminated or distorted by a repeated processing with the quality of the information signal unchanged.

The personal identification code may be introduced in frequency and/or time spaces of the information signal which are used and/or not used during the playback thereof. According to the inventive method the elimination of the personal identification code may be complicated by introducing the code periodically so that an at least substantially continous identification signal is obtained. In the case of a video signal this may comprise the step of providing in each field of the video signal a personal identification information. In order to complicate further a removal of the personal identification information the same may be introduced randomly into the information signal, in which case the randomness may be controlled by a pseudo-random generator comprised in said LSI circuit which e.g. may be built from a feedback coupled shift register the starting position of which is defined by a start bit sequence which is obtained from said personal data carrier. Then the actual start bit sequence and further data may be simultaneously recorded on the data carrier at the occasion of rent. In the case of a video programme, comprising video information as well as audio information, said pseudo-random introduction of the personal identification signal may comprise the step of introducing the personal identification code randomly under control of said pseudo-random generator into field lines outside the observable part of the field or a part of the audio channel which is not reproduced, respectively. The randomness may also comprise the step that the personal identification code is introduced randomly into different lines of each field, and then it is also possible to use lines which are reproduced. The randomness may further comprise the step that parts of the personal identification code is introduced into different lines of each field while using lines which are reproduced.

The elimination of personal identification code randomly introduced in this manner, without any knowledge about the pseudo-random sequence used during the introduction, necessitates an analysis of each separate field signal and/or the belonging audio channel. Thereafter, after detection of the personal identification information, the code must be eliminated in a manner such that the result thereof will not be observable or audiable. If possible at all a signal processing of this kind necessitates a deep professional knowledge and access to a highly complicated technical equipment. In order to further complicate such copying each video programme may be coded by a specific code which is changed between different programmes. The specific decoding information for each video disc or video tape, being necessary for the user, may then be transferred to the personal data carrier at the rent terminal. Thereby the risk is eliminated, that a reveal of the coding rule which is used will allow access to a number of different video programmes without requiring the actual decoding information.

One embodiment of the method according to the invention intended for a video programme carrier when using a personal identification code comprising a bit sequence having a defined number of bits, is characterized in that said personal data carrier at a rent terminal is provided with a modification information which is unique for the video programme, that the information signal after decoding is modified by a repeated bit-by-bit introduction of the personal identification bit sequence into the successive fields, in which at least one bit is introduced into one line interval of each field, and that said interval is selected randomly dependent on said modification information, which may form a start bit sequence for a pseudo-random generator built as a feedback coupled shift register and used for the control of the line interval selection.

DESCRIPTION OF THE DRAWINGS

The invention will be described in detail in the following with reference to the drawings, in which.

DESCRIPTION OF EMBODIMENTS

Figure 1:
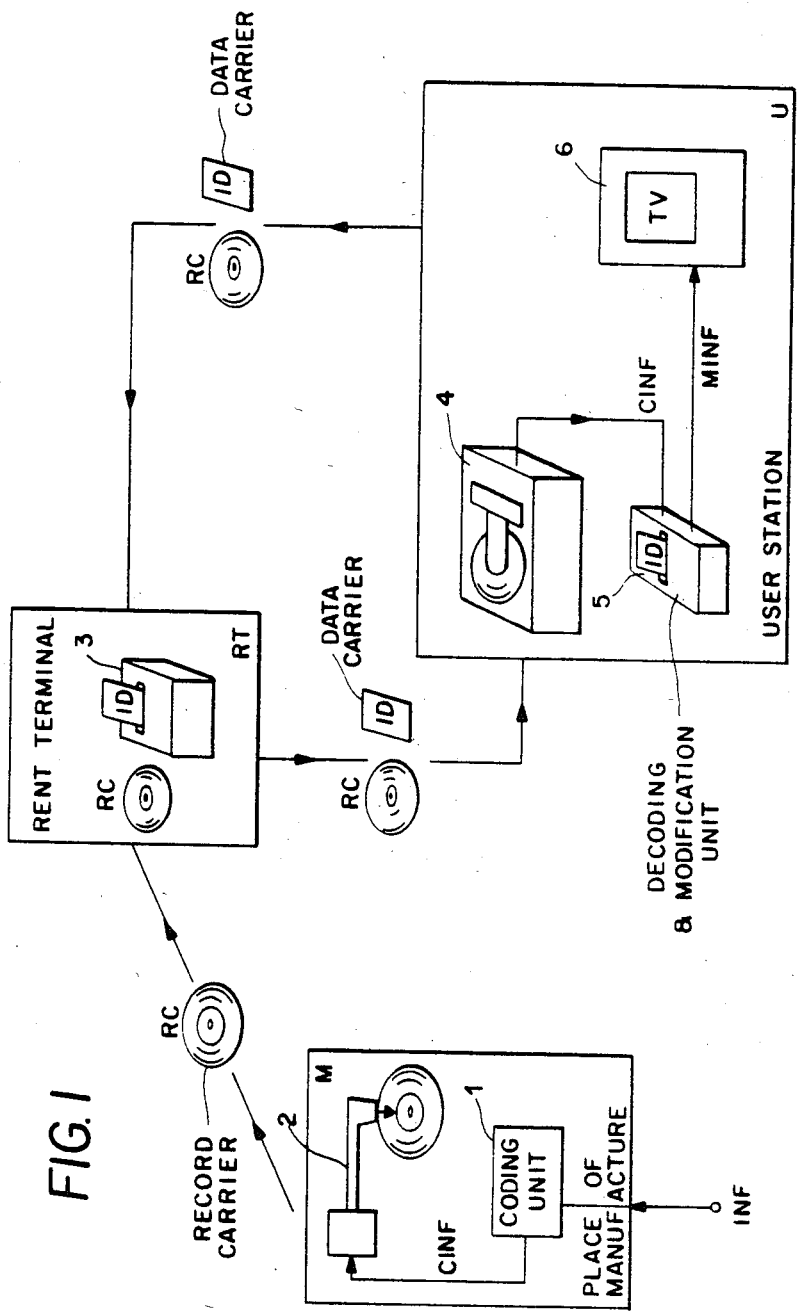
FIG. 1 illustrates the handling of a record carrier according to the invented method.

FIG. 1 illustrates the handling of a record carrier RC, which is represented presented by a video disc, from the place of manufacture M to the rent terminal RT, to the user U for playback and back to the rent terminal.

During recording the information signal INF is passed through a coding unit 1 which transforms or scrambles the signal according to a predetermined code, which may be specifically selected for the recording in question. By the processing in the coding unit 1 the information is distorted so that it may not be reproduced by means of a common video disc player and a belonging TV-apparatus. The coded information signal CINF will control a recording member 2, performing the recording of the signal on the video disc or a die for the manufacture thereof. For example, this recording may be performed optically by local melting of a metal layer on the record carrier base by the use of a laser beam the intensity of which is modulated dependent on the coded information signal.

Scrambling or coding of the information signal INF may be obtained in a number of different ways. Several methods may be found in the class 178/5.1 of the U.S. Patents. Specifically may be referred to U.S. Pat. No. 3,885,089 and U.S. Pat. No. 3,890,461.

U.S. Pat. No. 3,919,462 describes a method and an apparatus for scrambling and descrambling of signals. In the case of video signals is described a method which means scrambling by inversion of selected horizontal line signals of each field. By controlling this inversion of seperate lines or groups of lines dependent on a pseudo-random signal it is possible to obtain a scrambling the complexity of which may be selected. In the system described the necessary control or descrambling information is transmitted together with each line signal. When using this method in connection with the invention the information about the pseudo-random sequence which is used may instead be transferred to the user as a decoding information by means of a personal data carrier in accordance with the following description.

Scrambling may also be obtained by passing the video signal through a buffer memory, for example a CCD memory, having separately readable memory areas each for the storage of one horizontal line signal, and by reading said memory areas in a ranom sequence under the control of a pseudo-random signal. Said memory may store at least a number of line signals and eventuallay a complete field. Descrambling is obtained by means of a corresponding buffer memory in which the read-out is controlled by an identical pseudo-random signal. By a combination of the method according to U.S. Pat. No. 3,919,462, meaning a randomly controlled inversion of the horizontal lines, and the last mentioned method, meaning a randomly controlled horizontal line sequence, a scrambling is obtained which is even more hard to break.

A number of the video disc RC carrying the coded information is distributed to a rent terminal RT. A person who wants to rent a video disc at RT will get a personal data carrier ID by signing a counter declaration saying among other things that unauthorized copying of the video disc is not allowed.

Figure 4:
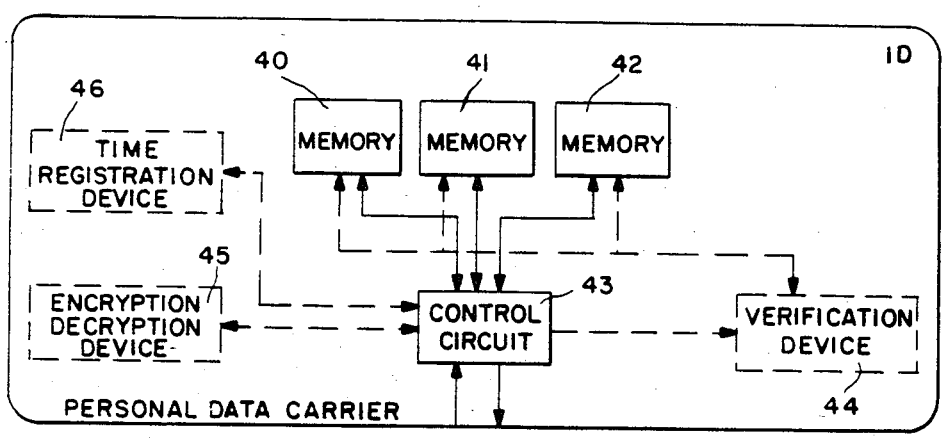
FIG. 4 shows schematically a card shaped personal data carrier according to the invention.

The data carrier ID may be a card of the same type as the so called cash dispenser cards and may comprise a magnetic loop having fields for the registration of a personal identification code, a decoding information, a modification information (see below) and data with respect to time, object and charge of rent. However, the data carrier will preferably comprise a so called active card comprising semiconductor memories and circuits for signal processing to some extent at least. Besides providing a protection of the contained information which is substantially improved, such an active card allows for a more flexible use of an increased amount of information compared to the magnetic cards, which among other things makes possible an improved protection against copying of tne record carrier RC. A data carrier which is built as an active card is shown in FIG. 4.

At RT a terminal unit 3 having means for writing and reading the data carrier ID is provided. This terminal unit may also comprise means for calculating the charge of rent, renting time, etc., and means for producing a payment receipt as well as a memory for storing continously the rent transactions, a memory for decoding information and a memory for modification information.

After storage of time of rent, decoding information, modification information, etc. on the data carrier ID and registration in the terminal unit of the personal identification code of the data carrier and the required information with respect to the video disc, the data carrier ID is returned to the customer together with the video disc which is rented.

The user U has available a video disc player 40 and a belonging supplementary device 5. In order to allow playing operation of video discs holding information which is not coded, the video disc player is shaped ordinarily for the actual type of video discs and consequently the same will supply a coded information signal CINF on its output. The output signal of the video disc player is supplied to the supplementary device 5, comprising a decoding and modification unit and belonging means 21 for reading and/or communication with the data carrier ID (see FIG. 2). In the supplementary. device 5 the information signal is decoded by means of the decoding information which is read from the data carrier ID and simultaneously the information signal is modified by the introduction of the personal identification code, which is likewise obtained from the data carrier. The introduction of the personal identification code depends on the modification information which is read from the data carrier. The information signal MINF, which is modified by the personal identification code, is supplied to a TV-apparatus 6 for reproduction, said personal identification code being according to the invention introduced in a manner such that it will not influence observably the reproduction. Specifically, when the method according to the invention is used for a broadcast television signal, the supplementary device 5 may instead belong to the TV-apparatus 6.

At the end of the rent time the customer returns to the rent termininal RT with the video disc RC and his data carrier ID. The disc is returned and the data carrier is introduced into the terminal unit which will then calculate the charge of rent and produce a payment receipt. If desirable said decoding and modification information may be eliminated from the data carrier by erasing the corresponding memory areas. After payment the data carrier is returned to the customer, said carrier may thereafter be used again for a new rent occassion later on.

Figure 2:
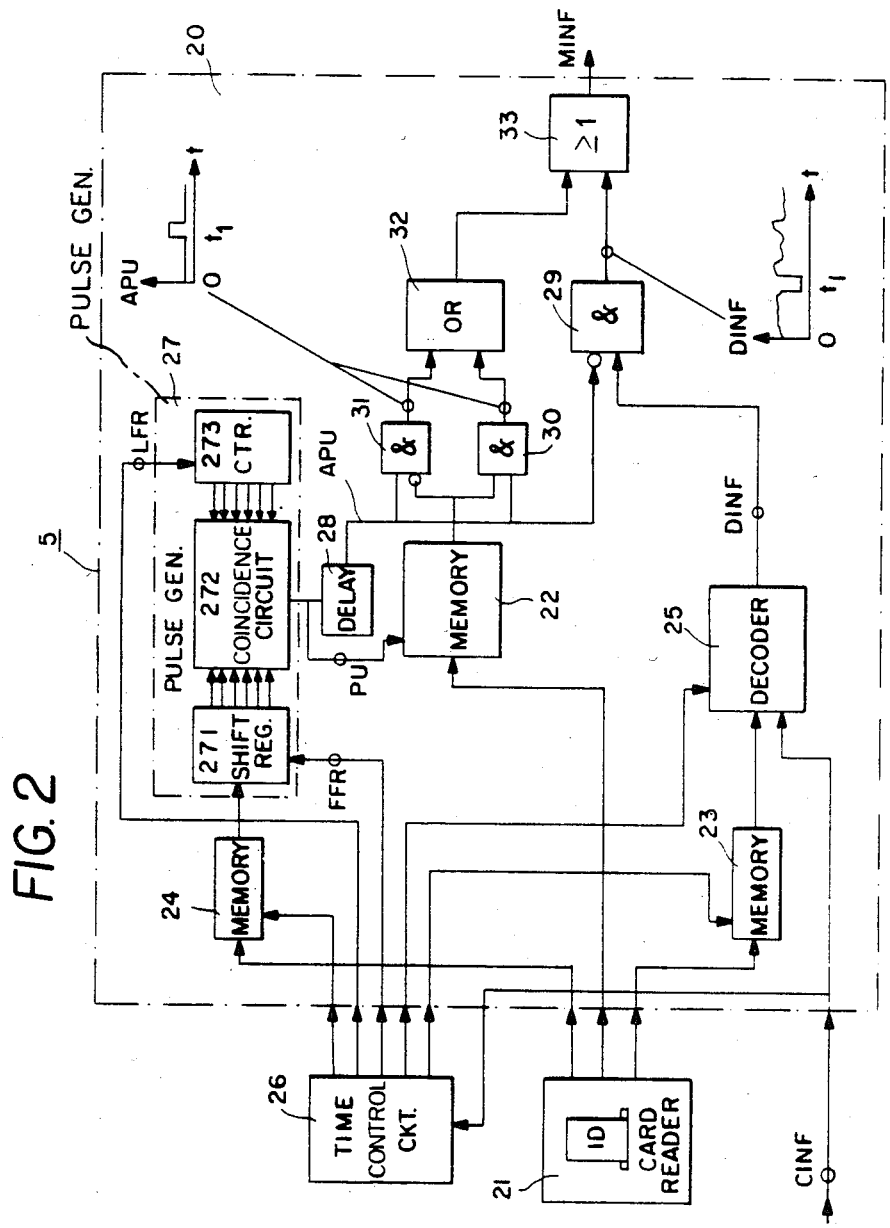
FIG. 2 shows a block diagramme of a supplementary device intended for the playback apparatus according to the invention.

In FIG. 2 a block diagramme is shown of one embodiment of the supplementary device 5 of FIG. 1. The card reader 21 thereof may be of a conventional type for the data carriers in question and for this reason it will not be further described in this connection. After it has been eventually verified (see below) that the data carrier ID is an authorized one, the card reader will read out said personal identification code, the decoding information and the modification information from the data carrier. Said information is stored temporarily in a corresponding personal identification code memory 22, a decoding information memory 23 and a modification information memory 24. Memories 22, 23, 24 may be realized as shift register circuits. The decoding information of memory 23 is supplied into a decoder 25 dependent on control information from a time control circuit 26. From the video disc player 4 (see FIG. 1) a further input of the decoder 25 is supplied with the coded information signal CINF read from the video disc. Signal CINF is supplied also to the time control circuit 26 for synchronization purposes. In decoder 25 the information signal is decoded dependent on said decoding information and control information supplied from said time control circuit 26. On the output of the decoder a decoded version of the information signal DINF is obtained.

The modification information of memory 24 comprises in this embodiment a start bit sequence for a feedback coupled shift register 271, which is comprised in a pulse generator 27 for the generation of one pulse during each field of the information signal and appearing at a randomly selected line of each field. In order to obtain this said pulse generator 27 comprises furthermore a counter 273, the cycle of which corresponds to the number of lines per field, that is 625/2 when the PAL system is used. Counter 273 is progressed by means of a line frequent advance pulse signal LFR which is obtained from the time control circuit 26. On a number of parallel outputs of counter 273 appears each time a bit sequence the numerical value of which corresponds to a specific line of the actual field. Said bit sequence is supplied to a corresponding number of inputs of a coincidence circuit 272, which on an equal number of parallel inputs is supplied with a bit sequence of a pseudorandom bit sequence, which is generated by the feedback coupled shift register 271 working as a pseudo-random generator. Shiftregister 271 is advanced by a field frequent advance pulse signal FFR which is obtained from the time control circuit 26. Consequently, the bit sequence which is supplied from 271 will be changed once per field. At coincidence between the bit sequences supplied thereto said coincidence circuit 272 will generate a pulse PU, the appearance of which will always coincide with a randomly selected line of each field.

The so generated pulse PU is intended for use during modification of the decoded information signal DINF by introduction of the personal identification code. For this purpose the pulse PU is processed in a pulse length adaption and delay circuit 28, in which said pulse will have a desirable pulse length and at the same time a delay which will give to the pulse an appearance time within that part of the line which may be observed during display. This adapted pulse APU appears on the output of circuit 28.

In this embodiment of the decoding and modification device the personal identification code is introduced randomly into the decoded information signal DINF. The personal identification code consists of a bit sequence, which may for example comprise 20 bits, which may assume a high or a low level corresponding to a binary "1" and a binary "0", respectively. The bit sequence is introduced bit-by-bit into the DINF signal by introduction of one bit into each field and then on a randomly selected line within each field. During introduction of said bits a binary "0" will have a signal level which for example may be 25% below an estimated amplitude mean value of the information signal, and a binary "1" will have a signal level which is 25% above said amplitude mean value. As an alternative, the amplitude level of the information signal may be sensed continously and the binary signal levels may be defined with respect to the momentary value of the information signal at the positions where bits of the binary signal are introduced.

This introduction of the personal identification code is obtained by means of the pulses PU and APU described above. The introduction is carried out in two steps by first shaping a required space in the DINF signal by blanking the safe within a given time slot and thereafter introducing the actual bit of the personal identification code into the time slot so shaped. Said time slot is obtained by supplying the decoded information signal DINF to one input of an AND-gate 29, to an inverted input of which the pulse APU is supplied. Thereby is obtained on the output of the circuit 29 a modified version of the DINF signal, which within each field and on a randomly selected line comprises a time slot within which the line signal is blanked. The time position and length of said slot is defined by the pulse APU. A line signal comprising such a time slot is shown schematically at the output of the AND-gate 29.

The memory 22 for the personal identification code may be realized as a shift register comprising an equal number of steps as the number of bits of the personal identification code and the output of which is feedback coupled to its input. This shift register is advanced by the pulse signal PU from generator 27. Thereby the register is advanced once per field and for each field a new bit of the personal identification code is held available on the output of the shift register. By said feed back coupling the shift register will go around and after an equal number of advance pulses as the number of bits of the personal identification code the first bit of the code will again appear at the output of the register. The output of the register is connected to one input of an AND-gate 30 to the second input of which is supplied said adapted pulse APU from circuit 28. The output of memory 22 is also connected to an inverted input of a further AND-gate 31 to a second input of which said APU pulse is supplied. If the bit of the personal identification code supplied from memory 22 is a "1", then the APU pulse is transferred via circuit 30 to a first input of a level adaption circuit 32. If the bit supplied by memory 22 is instead a "0", then the APU pulse is supplied via circuit 31 to a second input of the level adaption circuit 32. The pulse signals obtained from AND gates 30, 31 are shown schematically in connection with the outputs thereof. In said level adaption circuit the APU pulse will have the amplitude levels mentioned above, that is 125% of the amplitude mean value of the line signal in case the personal identification code bit is a "1" and 75% of said amplitude mean value in case the code bit is a "0". The so amplitude modulated APU pulse is supplied to one input of an OR-gate 33 to the second input of which the time slotted signal from the output of the AND circuit 29 is supplied. In said OR-gate 33 the level adapted APU pulse is introduced into the simultaneously appearing time slot, and the DINF signal with the so introduced bit of the personal identification code is obtained on the output of said OR-gate as a signal which is designated MINF.

Above the assumption has been, that the bit of the personal identification code, which is introduced into each field, is introduced on a randomly selected line and then at a fixed time position on said line which is settled by circuit 28. However, it is also possible to change said time position randomly within the line interval. Eventually, the pseudo-random sequence generated by the feed back coupled shift register 271 may be used for this purpose.

As mentioned in the introduction, the decoded information signal DINF must not be physically accessible or at least, it must be difficult to find access to the same. This may be obtained by building the circuit 20 indicated by means of dotted lines in FIG. 2 in the shape of an integrated circuit of LSI type, for which it may then be adequate to comprise on the one and same silicone wafer or chip all of the circuits shown in FIG. 2 besides the time control circuit 26 and of course the card reader 21. When an active data card is used as a personal data carrier the circuit 20 may be integrated into the card, and thereby the structure of the supplementary device 5 will be substantially simplified.

By the random introduction of the personal identification code bits and the level adaption described above during introduction, the risk of observable disturbances in the reproduced information is eliminated. At the same time is obtained that it will be combined with substantial difficulties, if possible at all, to eliminate the personal identification code by a repeated signal processing of the so "marked" information signal. On the other hand, the producer of the video disc, having a knowledge about the pseudo-random bit sequence which is used during the introduction and thereby the positions of appearance of the personal identification code bits, may determine in simple manner the personal identification code by sampling the information signal in control of the pseudo random bit sequence.

Figure 3:
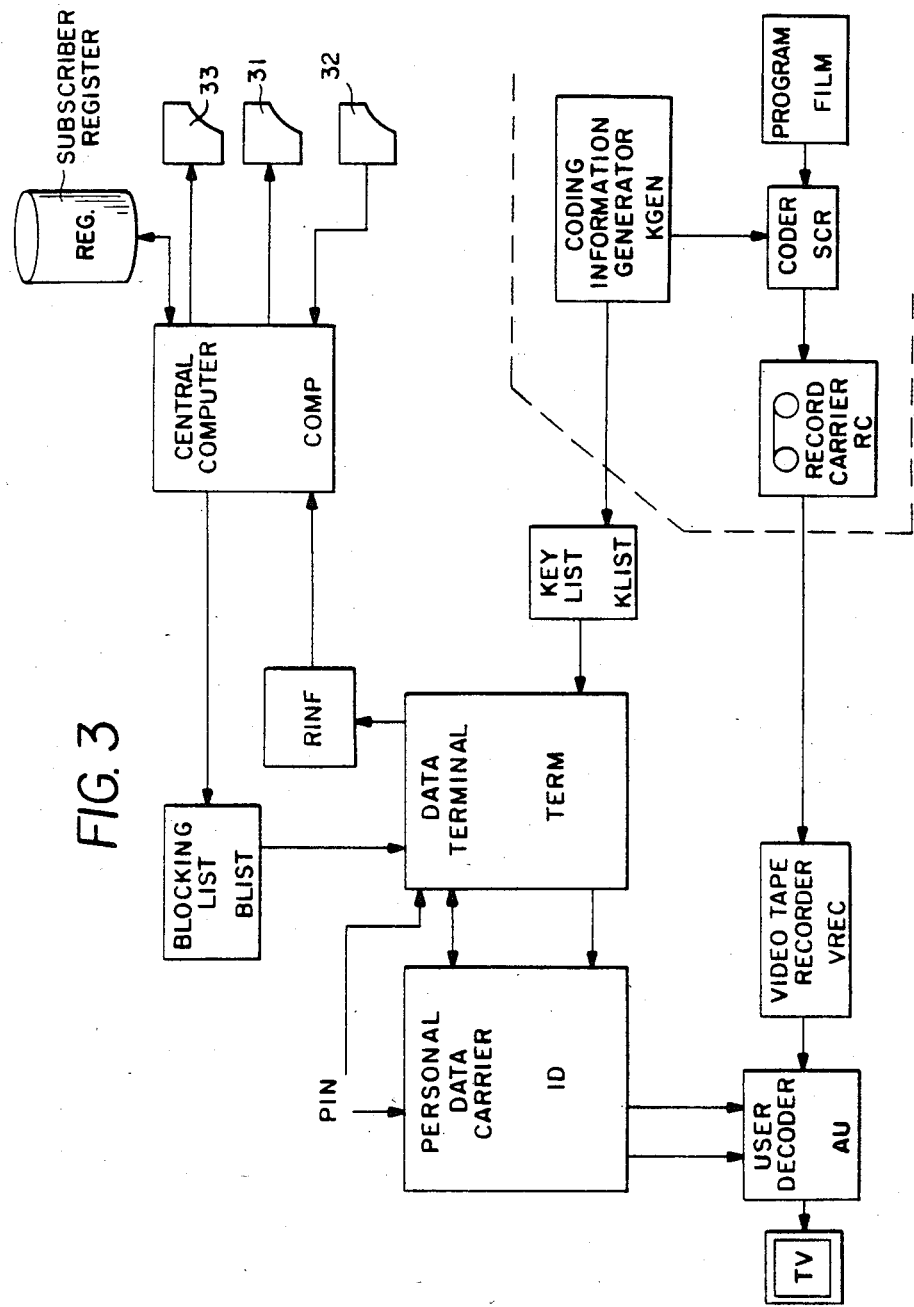
FIG. 3 shows schematically a data system for carrying out the method according to the invention when prerecorded video programmes are rented.

In FIG. 3 is shown a data system for renting of prerecorded video programmes while using the method according to the invention. The disclosed blocks represent hardware as well as software of the system and also functions performed in the system in accordance with the following description. For the sake of completeness the very production of the prerecorded programme carriers has been illustrated also, said carriers being in the figure represented by a video tape RC. The programme is a film FILM. This film is transferred to video and copied and at the same time the programme is coded or scrambled, SCR, while using a coding information or a key which is obtained from a key generator KGEN.

The video tape RC so coded i brought to a video tape recorder VREC of a user, which practically is done via a renting place in the way disclosed in FIG. 1. At the renting place a data terminal TERM is at hand, said terminal being connected on-line or off-line to a central computer COMP having a customer or subscriber register REG.

At the terminal TERM a so called key list KLIST is available on-line from said central computer or as stored in the terminal. By means of the key list each programme is associated to the coding key which has been used for the scrambling of the programme.

At the terminal TERM the personal data carrier ID is used for the input of customer identification information, for example an account number or a corresponding information. Simultaneously, the time of rent and a programme identification information is supplied to the terminal. Via the terminal the data carrier is programmed with the coding key information of the rented programme, which is obtained from the key list KLIST, and the belonging modification information as described above.

From the terminal the renting information RINF regarding the customer, the programme, the time of rent is supplied to the central computer COMP. When the video tape or video cassette is returned later on the corresponding information is supplied to the central computer for a second time. On basis of said information the COMP calculates a charge of rent which is debited to the customer for example once per month. This is shown at 31. When the customer has paid his bill this information is supplied to the COMP according to 32. Customers not attending to their payments will be registered on a blocking list BLIST which is kept available at each terminal of the system, and thereby the data cards having the corresponding account numbers will be unuseful in the system.

On basis of the information about the programme and the length of the renting period supplied at each occasion of rent the COMP distributes the paid renting fees between different right owners of the programme in accordance with a distribution rule which has been agreed upon for the programme in question. Information about this is supplied to the interest organisations of the right owners, like STIM and NCB according to 33. As a consequence the data system described allows for a distribution of received payments which are directly based on the real use of the video programmes.

At the place of the user the personal identification information and the decoding information or key is transferred to the decoder 25 (see FIG. 2) comprised in the supplementary or auxilliary device AU of the user and the modification information is supplied to memory 24. By this measure the information signal is decoded or descrambled and at the same time marked by the personal identification information dependent on the modification information in the way described above in connection with FIG. 2. The signal so processed is supplied to a TV-set.

In case a number of cassettes or discs carrying different programmes are rented at the one and same occasion the belonging information for decoding and modification are stored in the memory area of the data card at memory addresses corresponding to a programme identification information, which address information may be introduced also on each cassette or disc before the programme or information signal and then be used for the selection of the belonging decoding and modification information in the playback situation.

The data system will give a complete information about the situation on the market. A regional decrease of the frequency of rent of a given video production to a level which is clearly below an expected level in respect of the level within other regions, may easily be detected by the system. Such a decrease may have the background that pirate copies have appeared on the market in a number which is not neglectable. This may initiate an investigation within the region in order to find a pirate copy and thereafter the maker of the pirate copy is obtained directly from the personal identification information on the copy.

From a principle point of view the data security in the system may be obtained in the same way as in modern bank terminal arrangements. The threats which may appear are missuse of lost cards, appearing false cards and false terminals and tapping of transmitted information.

The first mentioned threat may be eliminated by the measure that each customer is given a so called PIN code, which must be memorized by the customer and supplied each time in order to make the data card useful. Ordinarily the terminal TERM comprises input means, which may be used for the supply of said PIN code. The auxilliary device of the customer may be supplemented by a corresponding input means which may then also be used for the input of said programme identification information for the selection of key and modification information, and thereby the address information for this selection will not need to be introduced for the information signal on the programme carrier. Modern TV apparatuses normally comprises a so called remote control unit which may also be used for the input of said information.

The personal data card, being preferably an active card, may also be provided with a key set or a corresponding means on the card itself. Cards of this type are known from the SE Patent Specification No. 7305050-2 and the U.S. Pat. No. 3,593,292. The problem of memorizing and supply of this personal identification information may be eliminated completely by the use of an active card of the type which is described in the SE patent application No. 8101707-1. The card described in this patent application comprises a device for sensing of the finger print of the owner and dependent thereon an activation of the card for further use.

The threat from false terminals and cards may be eliminated by the requirement that all units of the system between which transmission of data is carried out must be able to identify themselves mutually before a transmission may be carried out. For example this means that a card must be able to identify itself as authorized in the system against the terminal TERM or the auxilliary unit of the user and vice versa before a transmission between them may be carried out.

The information transmission in the system may be protected by encryption of the information and then at first hand the handling of the decoding keys should be protected in each step of transmission between the key generator station KGEN and the auxilliary device of the user.

The last mentioned two threats may be eliminated by the use of an encryption method according to which each transmitting and receiving unit of the system is given a so called "open" or generally available encryption key and an associated, unique and secret decryption key. This method is described in the article "Evaluation of public-key cryptosystems", D. W. Davies, W. C. Price, G. I. Parkin, IPC Business Press, vol. 2, No. 4, July 1980. An application of such an encryption method is described in SE patent application No. 8102268-3 directed to a bank terminal system in which threats of the mentioned type are eliminated.

FIG. 4 shows a card-shaped, personal data carrier intended for use in the renting data system disclosed in FIG. 3. The data carrier is shaped as a so called active card and comprises semi-conductor memories and logic circuits for internal processing of data information which is supplied thereto. As mentioned above in the description of FIG. 2 the data carrier in one design of the system may comprise necessary circuits for decoding and marking of the information signal, which means that the card comprises a micro processor and belonging memories and calculation logic. The card shown in FIG. 4 comprises memories for storing a personal identification information (40), a decoding key or decoding keys (41) and a modification or marking information (42) and also a circuit 43 for controlling the communication between the card and a card reader at the terminal TERM or the auxilliary unit (21 of FIG. 2). The physical structure of the card is in accordance with prior art of active cards. In this respect is referred to the following patent specifications: U.S. Pat. Nos. 3,637,994, 3,702,464, 3,906,460, 3,934,122, 4,001,550, DE No. 4.105.156, FR No. 4.102.493, FR 4.204.113.

The card may further comprise a verification device 44, by means of which the user of the card will have to verify his right of disposal of the card, for example by an evaluation of a PIN number of by sensing the finger print as mentioned above.

In a system in which the data security is solved by encryption as mentioned above the card comprises a device 45 for encryption/decription of the information which is transmitted from/supplied to the card.

As mentioned in the introduction the inventive method is useful also for the transmission of television signals. In a TV, system in which each possessor of a receiver will have to pay a given license fee for a given period of time, the method according to the invention means that the complete transmission is scrambled. By payment of said fee the memory 41 on the card in FIG. 4 is programmed with the descrambling code which is valid for the period of time. At the end of the period the code is changed and thereby further reception prevented. In this manner it is rendered obligatory to pay a new fee in order to obtain a new code.

In a so called pay-television system a fee is paid dependent on the time of use and the transmission may be carried out via a cable or a satellite. In such a system the card of FIG. 4 may comprise a using time registration device 46, which may be pre-programmable with time markings against payment of a fee. The actual descrambling code may be transmitted via the television channel, stored in memory 41 and kept available for descrambling as long as time markings are at hand in the memory 46. When the time markings are finished the descrambling code is blocked and thereby further reception is prevented. The card may also have the function of a credit card and then the descrambling code is kept available until a number of time markings corresponding to a predetermined credit limit have been stored in memory 46. The time may be measured dependent on a clock at the receiver or by means of signals which are transmitted via the television channel. The last mentioned type of time measurement also allows a programme selective charging of the the subscribers. The U.S. patent literature within the pay-television area is very extensive. In this respect may specifically be referred to U.S. Pat. No. 3,716,654.

It is underlined that the card described above may comprise also a memory for the storage of a time of rent and corresponding information. In the case of renting of prerecorded video programmes this means that the renting fee may be calculated directly at the terminal of the place of rent. This will make it possible for a customer to pay the fee directly at the place of rent or later on by billing via the central computer COMP, which is then supplied with information about the calculated renting fee.

The description above has primarily been directed to video information applications of the invention. However, the method according to the invention may be used also for record carriers holding audio information only. Then the newly developed, optical readable discs for recording audio information appears to be of special interest. One disc of this type is known under the mark "Compact disc" and comprises digitalized audio information. Then the binary values are recorded as holes and not holes in a metal layer on the carrier. Because of the fact that the audio information is digitalized it is specifically well fitted for coding as according to the invented method. Then it will be possible to offer said discs in two versions, that is as coded discs and as not coded discs. The coded version may then be purchased to a lower price than the not coded version as a compensation for the fact that a consumer of the coded disc must gain access to the required supplementary equipment for decoding. In this application it appears as adequate to choose a simplified embodiment of the method according to the invention. This may be obtained by using the one and same coding method for at least a number of said discs and by introduction of the personal identification code from the data carrier into a fixed frequency range outside the audible frequency range during reproduction of the disc. Thereby the record manufacturers will obtain an improved control over the gradually increasing copying of discs to so called tape cassettes.

The method according to the invention has been described for a number of selected uses. However, it is underlined that the area of use of the invention is not limited to said cases. The method according to the invention may be generally used for the protection of information carrying signals or software of any kind running the risk of being copied without authorization and commercially used.

I claim:

1. A method for processing a coded information signal, which coded information signal is transmitted from a signal source to a signal receiver, in order to mark the information content of the information signal and thereby to permit tracing of unauthorized copying of said information signal, the method comprising:
   decoding the information signal at a signal receiver during reception;
   obtaining an indentification information and unique modification information from a data carrier, said identification information comprising personal identification information in the form of a personal code comprising a bit sequence of a given number of bits;
   modifying the decoded information signal receiver by introducing into the decoded information signal said identification information;
   said identification information being a characteristic of at least one of said signal receiver and its possessor; and
   said identification information being introduced into at least one of time and frequency spaces of the decoded information signal such that the information content of said information signal is essentially unchanged.

2. The method of claim 1 wherein said data carrier comprises a card-shaped member having a programmable memory area for the storage of said identification information.

3. The method of claim 1, wherein said coded information signal is on a record carrier, and wherein said modifying step comprises reading said coded information from its associated record carrier, supplying said read-out information signal to a decoding and modification unit; supplying said identification information to said modification unit; and modifying said information signal by introducing said identification information into said at least one of time and frequency spaces of said decoded information signal.

4. The method of claim 1, wherein said modifying step comprises periodically introducing said identification information into said information signal to form a substantially continuously running identification signal in the modified information signal.

5. The method of claim 1, wherein said modifying step comprises generating modification information, which is unique to at least one of the signal information, the signal receiver and the identity of said possessor, and then introducing said identification information into said decoded information signal as a function of said modification information.

6. The method of claim 1, wherein said identification information comprises personal identification information in the form of a personal code comprising a bit sequence of a given number of bits, wherein said data carrier includes unique modification information, and wherein said modifying step comprises modifying said decoded information signal by a repeated bit-by-bit introduction of said personal identification bit sequence into said decoded information signal.

7. The method of claim 1, wherein said modifying step comprises introducing said identification information into said frequency and/or time spaces of said decoded information signal which are used at reproduction of said decoded information signal.

8. The method of claim 1, wherein said modifying step comprises introducing said identification into said time and/or frequency spaces of said decoded information signal which are not used during reproduction of said decoded information signal.

9. The method of claim 1, wherein said decoding information is valid only during predetermined periods of time, decoding being blocked during times other than said predetermined periods of time.

10. Apparatus for processing a coded information signal, which coded information signal is transmitted from a signal source to a signal receiver, in order to mark the information content of the information signal and thereby to permit tracing of unauthorized copying of said information signal, comprising:

means for decoding the information signal at a signal receiver during reception;

modifying means coupled to said decoding means for modifying the decoded information signal at said signal receiver by introducing into the decoded information signal an identification information, said identification information being a personal code in the form of a bit sequence having a given number of bits;

a source of modification information comprising said bit sequence having a given number of bits; and means at said receiver for generating said identification information as a characteristic of at least one of said signal receiver and its possessor;

said modifying means being coupled to said identification information means for introducing said identification information into at least one of time and frequency spaces of the decoded information signal such that the information content of said information signal is essentially unchanged.

11. The apparatus of claim 10, wherein said modifying means includes means for introducing said identification information into said decoded information signal under the control of said modification information.

12. The apparatus of claim 11, wherein said personal data is stored on a personal data carrier.

13. The apparatus of claim 10, wherein said modifying means comprises means for adapting the amplitude level of the introduced identification information signal to the amplitude level of said decoded information signal.

14. The apparatus of claim 10, wherein said decoding means and said modifying means are included in a single integrated semi-conductor circuit.

* * * * *